United States Patent
Kachru (10) Patent No.: US 9,274,282 B2
(45) Date of Patent: Mar. 1, 2016

(54) COUPLING LIGHT FROM AN EXTERNAL SOURCE TO A WAVEGUIDE USING A MULTI-STEP CONVERTER

(71) Applicant: Cisco Technology, Inc., San Jose, CA (US)

(72) Inventor: Ravinder Kachru, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 13/974,931

(22) Filed: Aug. 23, 2013

(65) Prior Publication Data

US 2015/0055912 A1 Feb. 26, 2015

(51) Int. Cl.
| | |
|---|---|
| *G02B 6/12* | (2006.01) |
| *G02B 6/30* | (2006.01) |
| *G02B 6/136* | (2006.01) |
| *G02B 6/122* | (2006.01) |

(52) U.S. Cl.
CPC .............. *G02B 6/305* (2013.01); *G02B 6/1228* (2013.01); *G02B 6/136* (2013.01); *G02B 2006/12195* (2013.01)

(58) Field of Classification Search
CPC .... G02B 6/0028; G02B 6/1228; G02B 6/305; G02B 2006/12195
USPC ..................................................... 385/28, 43
See application file for complete search history.

(56) References Cited

U.S. PATENT DOCUMENTS

| | | | | |
|---|---|---|---|---|
| 6,108,478 | A * | 8/2000 | Harpin et al. .................. | 385/129 |
| 7,088,890 | B2 * | 8/2006 | Liu .................................. | 385/43 |
| 7,444,055 | B2 * | 10/2008 | Tolstikhin et al. ............. | 385/131 |
| 7,650,052 | B2 * | 1/2010 | Krishnamoorthy et al. .... | 385/14 |
| 8,000,565 | B2 * | 8/2011 | Liu .................................. | 385/14 |
| 8,913,860 | B2 * | 12/2014 | Ushida et al. ................... | 385/43 |
| 2004/0017976 | A1 * | 1/2004 | Luo et al. ......................... | 385/43 |
| 2013/0114924 | A1 * | 5/2013 | Loh et al. ......................... | 385/14 |

OTHER PUBLICATIONS

Barkai, Assia et al., Efficient Mode Converter for Coupling between Fiber and Micrometer Size Silicon Waveguides, 4th IEEE International Conference on Group IV Photonics, Sep. 2007, IEEE, Piscataway, United States.
Sewell, P. et al., Rib waveguide spot-size transformers: modal properties, Journal of Lightwave Technology, May 1999, vol. 17, Issue 5, IEEE, Piscataway, United States.

(Continued)

*Primary Examiner* — Daniel Petkovsek
(74) *Attorney, Agent, or Firm* — Patterson & Sheridan, LLP (57) ABSTRACT

An optical device may include a waveguide converter that couples an external light-carrying medium to a waveguide embedded within the optical device. In one embodiment, the optical signal emitted from the light-carrying medium enters the converter which focuses the signal (e.g., shrinks the mode of the optical signal) to better match the physical dimensions of the waveguide. Using the converter may improve transmission efficiency relative to directly coupling (e.g., butt-coupling) the light-carrying medium to the waveguide. Specifically, the converter may enable the light-carrying medium to transmit the optical signal directly into the optical device without the use of any external lenses, even if the waveguide is a sub-micron waveguide.

8 Claims, 4 Drawing Sheets

(56) References Cited

OTHER PUBLICATIONS

Khilo, A. et al., Efficient planar single-mode fiber-to-chip coupler based on two-stage adiabatic evolution, Conference on Lasers and Electro-Optics (CLEO) and Quantum Electronics and Laser Science Conference (QELS), May 2010, Piscataway, United States.

Synopskys: Optical Solutions, 2013, <http://www.rsoftdesign.com/products.php?sub=Component+Design&itm=BeamPROP&det=Application+Gallery&id=1 >.

Barkai, A. et al., Double-Stage Taper for Coupling Between SOI Waveguides and Single-Mode Fiber, Journal of Lightwave Technology, Dec. 2008, vol. 26, Issue 24, Piscataway, United States.

\* cited by examiner

COUPLING LIGHT FROM AN EXTERNAL SOURCE TO A WAVEGUIDE USING A MULTI-STEP CONVERTER

TECHNICAL FIELD

Embodiments presented herein generally relate to waveguides in an optical device, and more specifically, to disposing a waveguide converter on the optical device for coupling the waveguide to an external light-carrying medium.

BACKGROUND

Silicon-on-Insulator (SOI) optical devices may include an active surface layer that includes waveguides, optical modulators, detectors, CMOS circuitry, metal leads for interfacing with external semiconductor chips, and the like. Transmitting optical signals from and to this active surface layer introduces many challenges. For example, a fiber optic cable may be attached to the SOI optical device and interface with a waveguide on its surface layer; however, the diameter of the one or more modes of the optic cable (e.g., approximately 10 microns for a single-mode cable) may have a much different size than the mode of a sub-micron dimensioned waveguide tasked with routing the optical signal in the SOI device. Accordingly, directly interfacing the fiber optic cable with the sub-micron waveguide may result in low transmission efficiency or high coupling loss (e.g., less than 1% coupling efficiency).

In some optical devices, lenses are used to focus the light from an external fiber optic cable into the waveguides, thereby shrinking the mode to a diameter that can be efficiently transferred into the sub-micron waveguides. However, using lenses increases the cost and complexity of the optical device. Moreover, the lenses need to be aligned to ensure the signal from the light-carrying medium focuses onto the waveguide. When a plurality of fiber optic cables are coupled into the optical device at a common interface, the diameter of the lenses used to focus the light from the respective optical cable may limit the number of cables that can be coupled to the optical device at the common interface.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment of the present disclosure includes an optical device that includes a substrate, a waveguide on the substrate, and an optical converter disposed between the waveguide and a coupling surface of the optical device. The optical surface is configured to optical couple the optical device to a light-carrying medium. The optical converter includes a first layer on the substrate where the first layer is coupled to the waveguide. The optical converter includes a second layer on the first layer where a length of the second layer, in a direction substantially transverse to the coupling surface, is less than a length of the first layer. The optical converter also includes a third layer on the second layer where a length of the third layer is less than the length of the second layer. Each of the first, second and third layers are horizontally tapered such that respective widths of the first, second, and third layers decrease along the lengths of the first, second, and third layers and the first, second, and third layers are made from the same material as the waveguide.

Another embodiment of the present disclosure includes optical system that includes a light-carrying medium and an optical device. The optical device includes a substrate, a waveguide on the substrate, and an optical converter disposed between the waveguide and a coupling surface of the optical device. The optical surface is configured to optical couple the optical device to the light-carrying medium. The optical converter includes a first layer on the substrate where the first layer is coupled to the waveguide. The optical converter includes a second layer on the first layer where a length of the second layer, in a direction substantially transverse to the coupling surface, is less than a length of the first layer. The optical converter also includes a third layer on the second layer where a length of the third layer is less than the length of the second layer. Each of the first, second and third layers are horizontally tapered such that respective widths of the first, second, and third layers decrease along the lengths of the first, second, and third layers and the first, second, and third layers are made from the same material as the waveguide.

Another embodiment of the present disclosure includes method that includes forming a waveguide on a substrate of an optical device and forming a first layer of an optical converter on the substrate such that the first layer is coupled to the waveguide. The optical converter is disposed between the waveguide and a coupling surface of the optical device configured to optical coupled the optical device to a light-carrying medium. The method includes forming a second layer of the optical converter on the first layer where a length of the second layer, in a direction substantially transverse to the coupling surface, is less than a length of the first layer. The method includes forming a third layer of the optical converter on the second layer where a length of the third layer is less than the length of the second layer. Each of the first, second and third layers are horizontally tapered such that respective widths of the first, second, and third layers decrease along the lengths of the first, second, and third layers. The first, second, and third layers are made from the same material as the waveguide.

Example Embodiments

An optical device may include a waveguide converter that couples an external light-carrying medium—e.g., a fiber optic cable or a signal generator such as a laser—to a waveguide embedded within the optical device. In one embodiment, the optical signal emitted from the light-carrying medium enters the converter which focuses the signal (e.g., shrinks the mode of the optical signal) to better match the physical dimensions of the waveguide. Using the converter may improve transmission efficiency relative to directly coupling (e.g., butt-coupling) the light-carrying medium to the waveguide. Specifically, the converter may enable the light-carrying medium to transmit the optical signal directly into the optical device without the use of any external lenses, even if the waveguide is a sub-micron waveguide.

In one embodiment, at least a portion of the waveguide converter is located on the same layer as the waveguide in the optical device. For example, the waveguide converter may include several layers stacked on top of each other where the bottom layer is coupled to the waveguide. To focus the optical signal into the waveguide, the respective lengths of the layers may increase when moving from the uppermost layer to the bottom layer of the stack. In addition to improving transmission efficiency when transferring the optical signal from the light-carrying medium to the waveguide, the converter may also efficiently transmit the optical signal from the waveguide to the light-carrying medium. Here, instead of focusing the mode of the signal to fit the dimensions of the sub-micron, the converter increases the diameter of the mode of the optical signal to more suitably match the physical dimensions of the light-carrying medium—e.g., the diameter of the core of an optical fiber.

Figure 1:
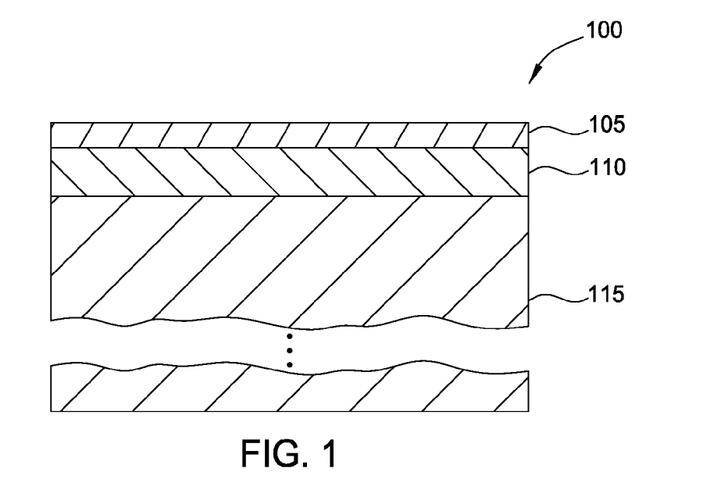
FIG. 1 illustrates a SOI device, according to one embodiment disclosed herein.

FIG. 1 illustrates a (silicon-on-insulator) SOI device 100, according to one embodiment disclosed herein. SOI device 100 includes a surface layer 105, a buried insulation layer 110 (also referred to as buried oxide (BOX) layer), and a semiconductor substrate 115. Although the embodiments herein refer to the surface layer 105 and substrate 115 as silicon, the disclosure is not limited to such. For example, other semiconductors or optically transmissive materials may be used to form the structure 100 shown here. Moreover, the surface 105 and the substrate 115 may be made of the same material, but in other embodiments, these layers 105, 115 may be made from different materials.

The thickness of the surface layer 105 may range from less than 100 nanometers to greater than a micron. More specifically, the surface layer 105 may be between 100-300 nanometers thick. The thickness of the insulation layer 110 may vary depending on the desired application. In one embodiment, the thickness of insulation layer 110 may range from less than one micron to tens of microns. The thickness of the substrate 115 may vary widely depending on the specific application of the SOI device 100. For example, the substrate 115 may be the thickness of a typical semiconductor wafer (e.g., 100-700 microns) or may be thinned and mounted on another substrate.

For optical applications, the silicon surface layer 105 and insulation layer 110 (e.g., silicon dioxide, silicon oxynitride, and the like) may provide contrasting refractive indexes that confine an optical signal in a silicon waveguide in the surface layer 105. In a later processing step, the surface layer 105 of the SOI device 100 may be etched to form one or more silicon waveguides. Because silicon has a higher refractive index compared to an insulator such as silicon dioxide, the optical signal remains primarily in the waveguide as it propagates across the surface layer 105.

Figure 2:
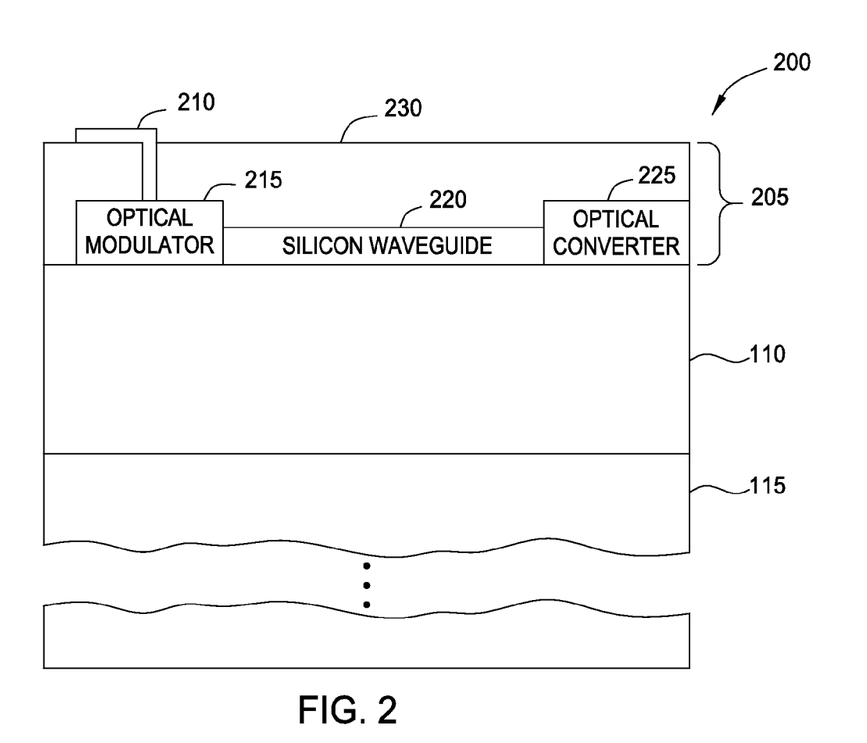
FIG. 2 illustrates a SOI device with a converter for coupling to an external light-carrying medium, according to one embodiment disclosed herein.

FIG. 2 illustrates a SOI device 200 with a converter for coupling to an external light-carrying medium, according to one embodiment disclosed herein. Like the SOI device 100 in FIG. 1, SOI device 200 includes a top surface layer 205, insulation layer 110, and substrate 115. However, the surface layer 205 has been processed to include various optical components that may be used in an optical device. For example, surface layer 205 includes an optical modulator 215 with a metal lead 210. The modulator 215 may be formed by performing various fabrication steps on the silicon layer such as etching or doping the silicon material as well as depositing additional materials onto surface layer 205. Metal lead 210 may be used to transmit a data signal that controls the optical modulator 215. For example, the optical modulator 215 may be a CMOS capacitor including n-type and p-type doped regions coupled to respective metal leads for changing the phase of the optical signal passing through the modulator 215. Although not shown, the metal lead 210 may be connected to an integrated circuit mounted onto the SOI device 200 that provides the one or more data signals that control the modulator 215. In another embodiment, the integrated circuit may be physically separate from the SOI device 200 but couple to the metal lead 210 via a bond wire.

Like optical modulator 215, the silicon waveguide 220 may have been fabricated from a silicon surface layer (e.g., layer 105 of FIG. 1). SOI device 200 may use waveguide 220 to carry an optical signal to different areas of the surface layer 205. For example, an input of optical modulator 215 may receive the optical signal via waveguide 220, modulate the signal, and transmit the resulting signal along a different waveguide coupled to an output of the optical modulator 215.

In addition to including components made from silicon, surface layer 205 may include other components (not shown) which may be made from other materials (e.g., a geranium detector) or a combination of silicon with other materials. The other materials may be deposited on surface layer 205 using any suitable deposition techniques. Once the surface layer 205 is processed to include the desired components, the components may be covered with a protective material 230 (e.g., an electrical insulative material) which may serve as a suitable base for mounting additional circuitry on the SOI device 200. In this manner, the silicon surface layer 205 of SOI device 200 may be processed using any number of techniques to form a device for performing a particular application such as optical modulation, detection, amplification, generating an optical signal, and the like.

Surface layer 205 also includes an optical converter 225 coupled to the silicon waveguide 220. As shown, one interface of the optical converter 225 is coupled to the waveguide 220 while another interface is proximate to an outer or external surface of the SOI device 200. Although the optical converter is shown as being exposed on the outer surface of the device 200, in other embodiments the converter 225 may be recessed slightly from the outer surface. In one embodiment, the converter 225 may be made of the same material as the waveguide 220. For example, the converter 225 and waveguide 220 may both be made of silicon. In one embodiment, the converter 225 may include a plurality of stacked layers that are processed (e.g., etched) such that an optical signal striking the exposed surface of the converter is focused into the waveguide 220.

The waveguide converter 225 may be designed to efficiently couple to an external light-carrying medium. As explained above, because the dimensions of the silicon waveguide 220 may result in high optical losses if directly connected to an external light-carrying medium, the light-carrying medium may instead be coupled to the converter 225 which then transfers the signal into the silicon waveguide 220. Doing so may eliminate the need for using lenses between the external light-carrying medium and the waveguide 220 which focus the optical signal into a mode with a diameter similar to the dimensions of the waveguide 220. Stated differently, the converter 225 may permit the external light-carrying medium to transmit light directly into SOI device 200 without the addition of external focusing elements such as lenses.

Figure 3:
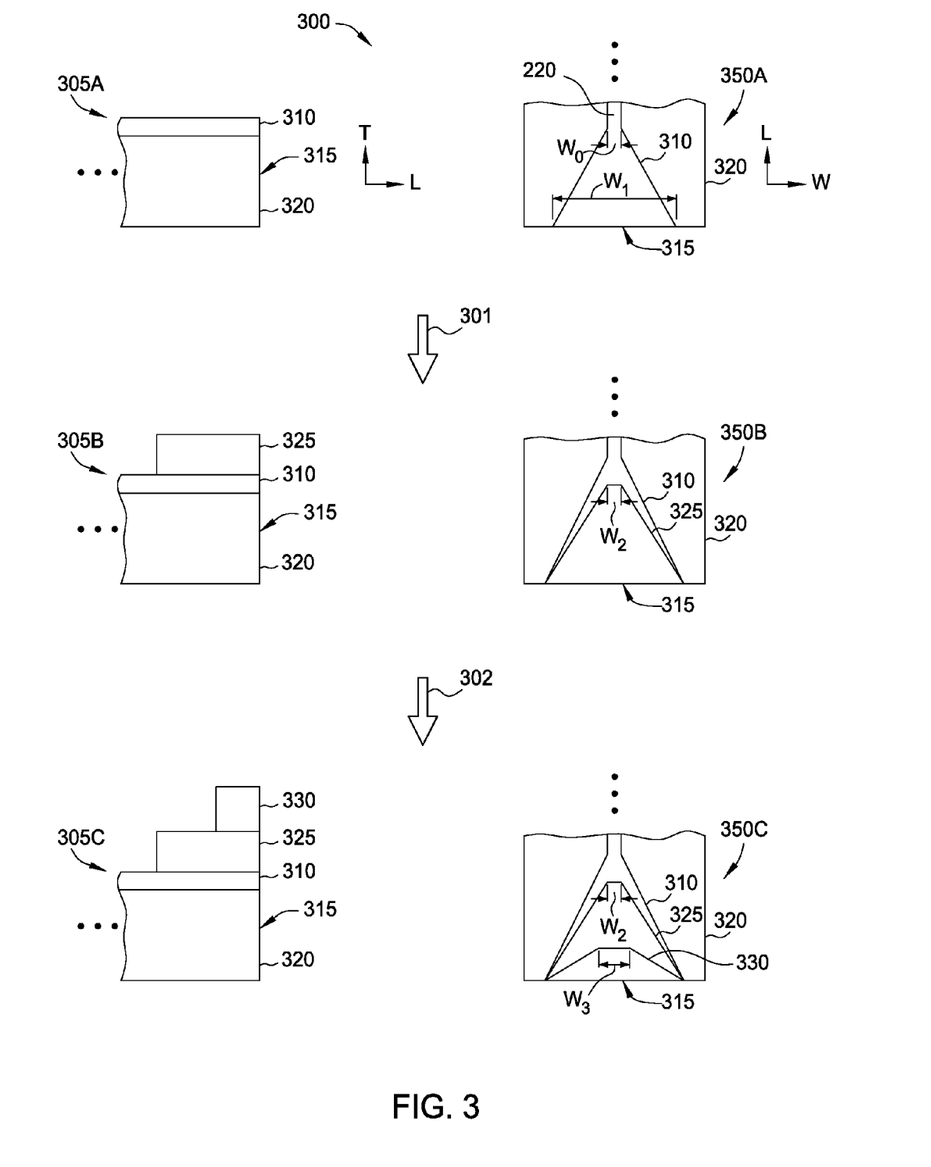
FIG. 3 illustrates a flow for fabricating a converter for coupling to a light-carrying medium, according to one embodiment disclosed herein.

FIG. 3 illustrates a flow 300 for fabricating a converter for coupling to a light-carrying medium, according to one embodiment disclosed herein. Specifically, the left side of FIG. 3 illustrates a side view of the optical device when fabricating the converter while the right side of FIG. 3 illustrates a top view of the same optical device. Side view 305A includes a substrate 320 (e.g., insulation layer 110) and a first layer 310 of the converter. In one embodiment, the first layer 310 may have been formed in the surface layer (e.g., silicon surface layer 105 of FIG. 1) of an SOI device. For example, after applying photoresist and a mask, the surface layer may be etched to form the first layer 310 and the waveguide 220 as shown in the top view 350A. Alternatively, the first layer 310 may be deposited onto the substrate 320 and subsequently formed into the desired pattern. If the optical device is a SOI device, polysilicon may be deposited onto the substrate 320 to form the first layer 310 so that the silicon waveguide 220 is the same material as the first layer 310.

As shown, the first layer 310 is exposed at a coupling interface 315 which may be used by the optical device to transmit an optical signal to, or receive an optical signal from, an optical fiber or other light-carrying medium. As shown by top view 350A, the first layer 310 is formed (e.g., etched) to have a horizontal taper (also known as a ribbed taper) such that the width (W) of the first layer decreases as the first layer 310 extends away from the coupling interface 315. Although FIG. 3 shows that the horizontal tapers is continuous, linear change, in other embodiments, the taper may be discontinuous (e.g., step-wise or include a plurality of discrete changes) or may change exponentially. In one embodiment, the thickness of the first layer may be a similar thickness of the silicon waveguide 220—e.g., between 100 nm to 300 nm—while the width ($W_0$) of the waveguide 220 may range between 200 nm to 700 nm. In one embodiment, the thickness of the silicon waveguide 220 may correspond to the thickness of the upper silicon layer of an SOI device.

As the first layer 310 tapers, the width ($W_1$) proximate to the coupling interface 315 may increase to approximately 8 to 10 microns. However, the width $W_1$ may be designed to correspond to the diameter of the mode of the optical signal being transmitted into the optical device. For example, the width $W_1$ may be the same, or substantially the same (within 10-15%), as the width of an optical fiber that transmits the optical signal into the coupling interface 315. Thus, one of ordinary skill will note that the width $W_1$ may be varied depending on the particular application or implementation of the optical device. The length of the first layer 310 (e.g., the distance from the coupling interface 315 to the waveguide 220) may range from 1 mm to 4 mm, and more specifically, from 2.5 mm to 3 mm.

Arrow 301 illustrates forming a second layer 325 onto the optical device—e.g., silicon is deposited onto the first layer 310 and then patterned into the desired shape. Side view 305B illustrates that the second layer 325 may have a greater thickness than the first layer 310. The thickness of the second layer 325 may range from 0.5 to 5 microns, and more specifically, from 1 to 3 microns. As shown by top view 350B, the width of the second layer 325 at the coupling interface 315 may be the same as the first layer 310 although this is not a requirement. The lengths of the two layers 310, 325, however, may be different which results in the second layer 325 having a horizontal taper with a greater slope than the taper of the first layer 310. The length of the second layer 325 may range from 1 mm to 3 mm, and more specifically, between 2 mm to 3 mm. In addition, the second layer 325 may terminate to form a surface that is opposite the coupling interface 315. This termination surface may have a width ($W_2$) that is between 50 nm to 250 nm, and more specifically, between 100 nm to 200 nm.

Arrow 302 illustrates forming a third layer 330 onto the optical device. In one embodiment, the third layer 330 may be made of silicon deposited onto the second layer 325 that is then pattern into the desired shape. Side view 305C illustrates that the third layer 330 may have a greater thickness than the second layer 325. The thickness of the third layer 330 may range from 1.5 microns to 4 microns, and more specifically, between 2.5 to 3 microns. As shown by top view 350C, the width of the third layer 330 at the coupling interface 315 may be the same as the first and second layers 310, 325 although this is not a requirement. The length of the third layer 330, however, may be shorter than the length of the second layer 325 which results in the third layer 330 having a horizontal taper with a greater slope than the taper of the second layer 325. The length of the third layer 330 may range from 0.2 mm to 1 mm, and more specifically, between 0.3 mm to 0.7 mm. In addition, the third layer 330 may terminate to form a surface that is opposite the coupling interface 315. This termination surface may have a width ($W_3$) that is between 0.5 microns to 1.2 microns, and more specifically, between 0.6 microns and 0.9 microns. In one embodiment, the deposited layers may be annealed. For example, if the second and third layers 325, 330 are deposited, these layers may be annealed to form a polysilicon.

In one embodiment, the stack including the first, second, and third layers 310, 325, and 330 may be designed to have total thickness that is equal to or less than the diameter of the mode of optical signal or the diameter of the optical fiber coupled to the interface 315. Similarly, the width $W_1$ of the layers 310, 325, and 330 may be equal to or less than the diameter of the mode of the optical signal or the optical fiber. For example, if the optical device is coupled to a standard fiber optic cable with a 9 micron core which transmits a single-mode optical signal, the width $W_1$ of the layers 310, 325, and 330 may be around 9 microns. The thicknesses of the layers 310, 325, and 330 may be around 0.1 microns, 2.1 microns, and 2.8 microns, respectively, for a total thickness of approximately 5 microns. The lengths of the layers 310, 325, and 330 may be around 2.8 mm, 2.4 mm, and 0.5 mm, respectively.

Although three layers are shown, the present disclosure is not limited to such and may include a stack including any number of layers—e.g., two layers or four layers. Nonetheless, if additional layers are added to the stack, the length of the additional layers may be chosen to maintain the substantially step-wise shape shown in side view 305C. That is, the stack may be designed such that the lengths of the horizontally tapered layers decrease as the stack progresses from the bottom layer (e.g., first layer 310) to the top layer (e.g., third layer 330). Doing so may maintain the ability of the converter to focus received light into the waveguide 220 coupled to the first layer 310. Although a step-wise or discrete change is shown, in one embodiment, the converter may be shaped to have a more linear or continuous vertical taper. For example, a grey-scale lithography technique may be used to form a linear vertical taper in the layers. However, because of the costs and quality control issues with grey-scale lithography, using planar etching techniques as shown in FIG. 3 may be preferred.

The material of the layers 310, 325, and 330 may be the same or different. In one embodiment, the material of layers 310, 325, and 330 is the same as the material of the waveguide 220. Thus, if the waveguide 220 is formed in the upper layer of a SOI device, the layers 310, 325, and 330 may be formed from silicon. In other examples, the layers 310, 325, and 330 may be made of silicon nitride, silicon oxynitride, and the like.

Figure 4:
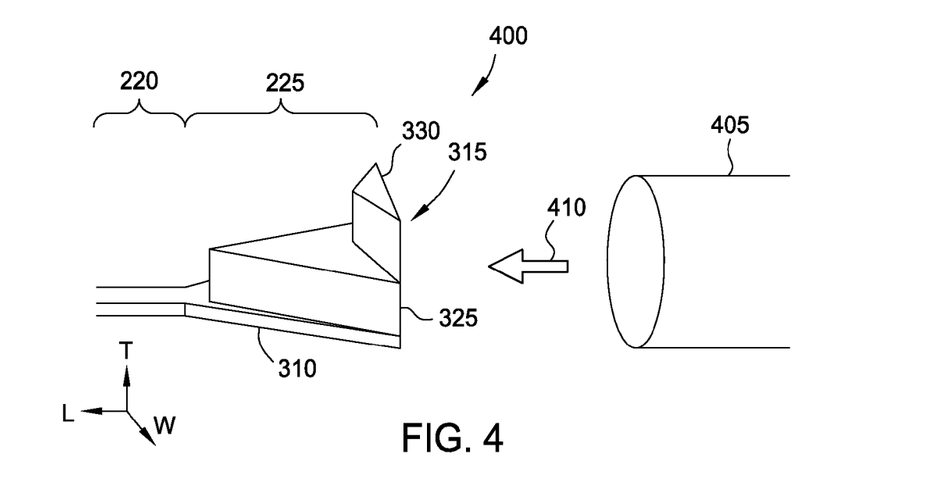
FIG. 4 illustrates a plan view of a waveguide with a converter for coupling to a light-carrying medium, according to one embodiment disclosed herein.

FIG. 4 illustrates a plan view of a waveguide with a converter for coupling to a light-carrying medium, according to one embodiment disclosed herein. The system 400 includes converter 225 coupled to waveguide 220 and a light-carrying medium 405. For clarity, other layers and materials in an optical device that includes the waveguide 220 and converter 225 have been omitted. As shown by arrow 410, the light-carrying medium 405 may be aligned with the coupling interface 315 of the converter 225. Using the coupling interface 315, an optical signal may be transmitted from the waveguide 220 to the light-carrying medium 405 or from the light-carrying medium 405 to the waveguide 220. In one embodiment, the coupling interface 315 may be used to only transmit the optical signal in one direction—i.e., either from the waveguide 220 to the medium 405 or from the medium 405 to the waveguide 220. For example, the light-carrying medium 405 may be a laser that transmits a generated optical signal into the coupling interface 315. In another embodiment, the coupling interface 315 may be used to transmit an optical signal in both directions. For example, the light-carrying medium 405 may be a fiber optical cable where, at Time X, the cable transmits the optical signal into the coupling interface 315 but at Time Y the cable receives the optical signal from the coupling interface 315.

FIG. 4 illustrates that the light-carrying medium 405 may be optically coupled to sub-micron waveguide without the use of a focusing element external to the optical device. Because the converter 225 may be integrated (or fabricated) inside the optical device, the light-carrying medium 405 may be directly coupled (e.g., butt coupled) to the optical device at the coupling interface 315. This may reduce the time required to optically coupled the light-carrying medium 405 to the optical device since focusing elements do not need to be aligned to the sub-micron waveguide 220. As used herein, a "sub-micron" waveguide is a waveguide where the dimensions perpendicular to the direction of propagation of the optical signal (i.e., height and width) are both less than one micron.

Figure 5A:
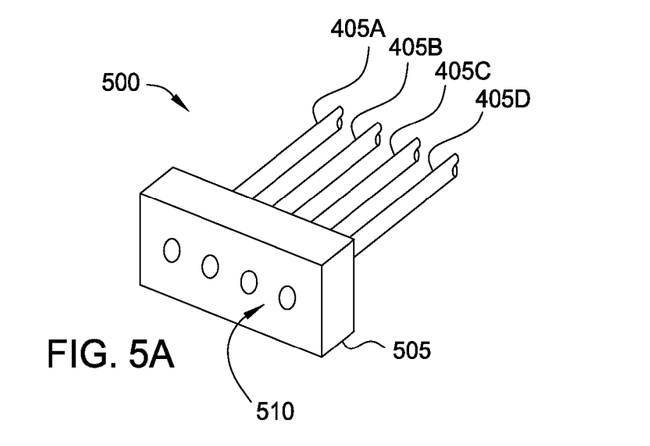
FIGS. 5A-5B illustrate an array of light-carrying mediums, according to embodiments disclosed herein.
Figure 5B:
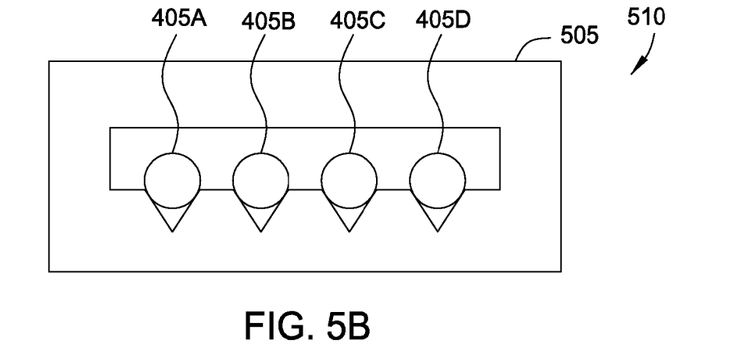

FIGS. 5A-5B illustrate an array 500 of light-carrying mediums, according to embodiments disclosed herein. FIG. 5A illustrates a plurality of light-carrying mediums 405A-D physically attached to a connector 505 to form the array 500. The connector may provide physical stability to the light-carrying mediums 405 and fix the position of the ends of the light-carrying mediums 405 relative to each other. Connector 505 defines a device interface 510 where the ends of the light-carrying mediums 405A-D are exposed.

FIG. 5B illustrates a close-up, front view of the device interface 510. As shown here, the light-carrying mediums 405A-D terminate at the interface 510. Moreover, to set the spacing between the ends, the connector 505 includes respective V-grooves which are used to mount the tips of the light-carrying mediums 405. Although V-grooves are shown, any type of alignment structure may be used—e.g., U grooves, guides, etc. Moreover, the ends of the light-carrying mediums 405 may be fixed into place using a mechanical structure (e.g., a clamp) or an adhesive (e.g., epoxy). Regardless of the particular design of the connector 505, FIGS. 5A and 5B illustrate that a plurality of light-carrying mediums 405A-D may be arranged in an array 500 in anticipation of connecting the array 500 to an optical device.

Figure 6A:
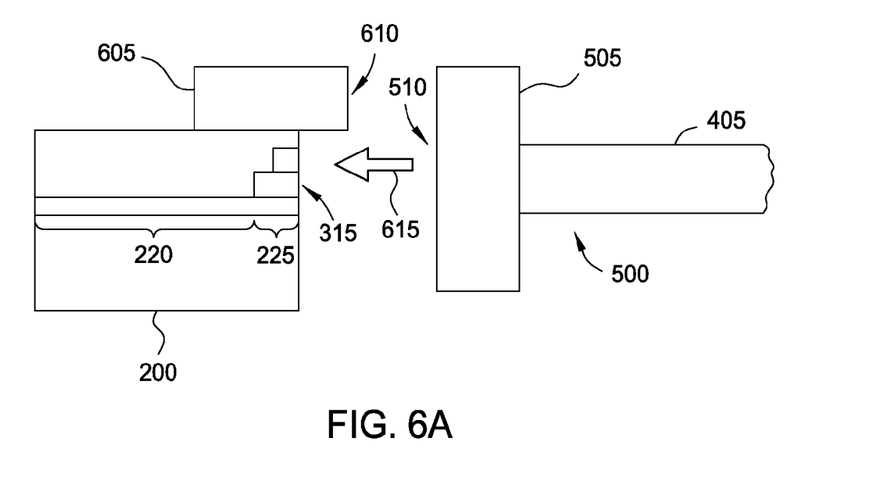
FIGS. 6A-6B illustrate coupling an array of light-carrying mediums to a plurality of waveguides and converters, according to embodiments disclosed herein.
Figure 6B:
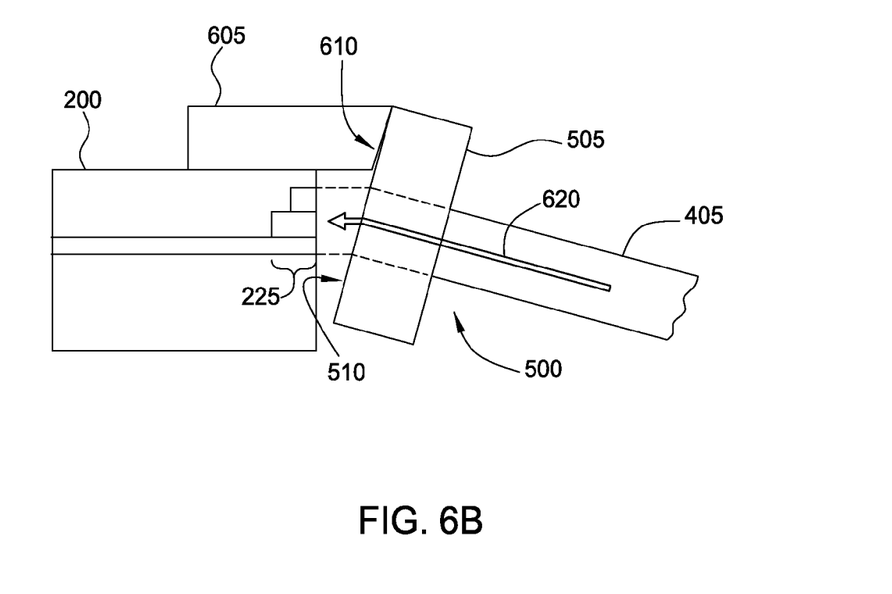

FIGS. 6A-6B illustrate coupling an array 500 of light-carrying mediums to a plurality of waveguides and converters, according to embodiments disclosed herein. As shown, FIG. 6A illustrates an optical device 200 (e.g., a SOI device) with a waveguide 220 coupled to the converter 225 with at least one side that is proximate to the coupling interface 315 as discussed previously. A connector portion 605 physically couples the light-carrying medium 405 to the device 200, thereby enabling transfer of an optical signal therebetween. The connector portion 605 includes a connecting interface 610 configured to physically connect to the device interface 510 of the connector 505. As shown by arrow 610, the array 500 may be aligned with the optical device 200 such that each end of the light-carrying mediums 405 of the array 500 lines up with a respective converter 225 in the optical device 200. Although not shown by the side view in FIG. 6A, the optical device 200 may include a plurality of waveguide 220 and converter 225 pairs exposed at the coupling interface 315 that are spaced to align with a respective light-carrying medium 405 in the array 500.

Once the light-carrying mediums 405 are aligned with the converters 225, the device interface 510 may be physically attached at the connecting interface 610 to maintain the alignment—e.g., the connector portion 605 is attached to the connector 505 using an adhesive. Although FIG. 6A illustrates that the optical signal may travel through air before when passing between the converter 225 and the device interface 510, in other examples, the connector portion 605 may be designed such that the converter 225 and the end of the light-carrying medium 405 exposed at the device interface 510 directly abuts.

FIG. 6B illustrates another example of coupling the array 500 to the optical device 200. Here, due to the difference between the refractive indexes of the material of the light-carrying medium 405 and air, the propagation path of the optical signal may bend as the signal leaves or enters the light-carrying medium 405. This bend is shown by arrow 620. To account for the bend, the connecting interface 610 of the connector portion 605 may be formed at a slight angle relative to the coupling interface 315—e.g., 5-10%. By ensuring that the device interface 510 is flush with the connecting interface 610, the optical signal may efficiently pass from the light-carrying medium 405 to the converter 225 and vice versa. One of ordinary skill in the art will recognize the materials used in the light-carrying medium may determine when to use the embodiment shown in FIG. 6A where the longitudinal axis of the waveguide 220 and the longitudinal axis of the medium 405 are aligned on the same plane or when to use the embodiment shown in FIG. 6B where the respective longitudinal axes are misaligned.

CONCLUSION

The embodiments described above disclose an optical device which includes a waveguide converter that couples an external light-carrying medium to a waveguide embedded within the optical device. In one embodiment, the optical signal emitted from the light-carrying medium enters the converter which focuses the signal (e.g., shrinks the mode of the optical signal) to better match the physical dimensions of the waveguide. Using the converter may improve transmission efficiency relative to directly coupling (e.g., butt-coupling) the light-carrying medium to the waveguide. Specifically, the converter may enable the light-carrying medium to transmit the optical signal directly into the optical device without the use of any external lenses, even if the waveguide is a sub-micron waveguide.

In one embodiment, at least a portion of the waveguide converter is located on the same layer as the waveguide in the optical device. For example, the waveguide converter may include several layers stacked on top of each other where the bottom layer is coupled to the waveguide. To focus the optical signal into the waveguide, the respective lengths of the layers may increase when moving from the uppermost layer to the bottom layer of the stack. In addition to improving transmission efficiency when transferring the optical signal from the light-carrying medium to the waveguide, the converter may also efficiently transmit the optical signal from the waveguide to the light-carrying medium. Here, instead of focusing the mode of the signal to fit the dimensions of the sub-micron, the converter increases the diameter of the mode of the optical signal to more suitably match the physical dimensions of the light-carrying medium—e.g., the diameter of the core of an optical fiber.

The flowchart and block diagrams in the Figures illustrate the architecture, functionality and operation of possible implementations of systems, methods and according to various embodiments. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

I claim:

1. An optical device comprising:
   a substrate;
   a waveguide on the substrate, wherein the waveguide is a silicon waveguide with a width and a thickness that is less than one micron, wherein the width and thickness are perpendicular to a direction of propagation of the optical signal in the waveguide;
   an optical converter disposed between the waveguide and a coupling surface of the optical device configured to optically couple the waveguide to a light-carrying medium, the optical converter comprising:
   a first layer on the substrate, the first layer being coupled to the waveguide,
   a second layer disposed on the first layer, where a length of the second layer is less than a length of the first layer, and
   a third layer on the second layer, where a length of the third layer is less than the length of the second layer, wherein the respective lengths of the first, second, and third layers are in a direction substantially transverse to the coupling surface,
   wherein each of the first, second and third layers are horizontally tapered such that respective widths of the first, second, and third layers decrease along the lengths of the first, second, and third layers,
   wherein a thickness of the third layer is greater than a thickness of the second layer, and wherein the thickness of the second layer is greater than a thickness of the first layer,
   wherein the thickness of the first layer ranges between 100 nm to 300 nm, the thickness of the second layer ranges from 0.5 to 4 microns, and the thickness of the third layer ranges from 1.5 to 4 microns,
   wherein the first, second, and third layers are made from silicon.

2. The optical device of claim 1, wherein the length of the first layer is greater than 1 mm.

3. The optical device of claim 1, wherein respective widths of the first, second, and third layers proximate to the coupling surface are the same.

4. The optical device of claim 1, wherein a thickness of the first layer is the same thickness as the waveguide.

5. The optical device of claim 1, wherein the optical device is a silicon-on-insulator (SOI) device, wherein the substrate is an insulation layer of the SOI device and the waveguide and first layer are part of a upper, silicon layer of the SOI device directly on the insulation layer.

6. The optical device of claim 1, wherein the second and third layers comprise a termination surface opposite and parallel to the coupling surface,
   wherein a width of the first layer is equal to the width of the waveguide, the width of the termination surface of the second layer is less than or substantially equal to the width of the of the first layer, and the width of the third layer is greater than or substantially equal to the width of the first layer.

7. The optical device of claim 6, wherein the width of the waveguide is between 200 to 700 nm; the width of the termination surface of the second layer is between 100 to 200 nm; and the width of the termination surface of the third layer is between 600 to 900 nm.

8. The optical device of claim 1, wherein a combined thickness of the first, second, and third layers is less than or equal to 5 microns.

* * * * *